(12) United States Patent
Munakata (10) Patent No.: US 8,594,919 B2
(45) Date of Patent: Nov. 26, 2013

(54) ON-VEHICLE ROAD CONFIGURATION IDENTIFYING DEVICE

(75) Inventor: Kohsuke Munakata, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 1003 days.

(21) Appl. No.: 11/735,298

(22) Filed: Apr. 13, 2007

(65) Prior Publication Data

US 2007/0265777 A1    Nov. 15, 2007

(30) Foreign Application Priority Data

May 15, 2006  (JP) ................................. 2006-134721

(51) Int. Cl.
*G01S 13/93* (2006.01)
*G08G 1/16* (2006.01)
*B60R 21/00* (2006.01)
*B60W 30/095* (2012.01)

(52) U.S. Cl.
USPC ............................ 701/300; 701/301; 701/515

(58) Field of Classification Search
USPC ............. 342/70; 382/103; 701/213, 300–309, 701/515
See application file for complete search history.

(56) References Cited

U.S. PATENT DOCUMENTS

| | | | | |
|---|---|---|---|---|
| 5,572,428 | A * | 11/1996 | Ishida et al. | 701/301 |
| 5,612,699 | A * | 3/1997 | Yamada | 342/70 |
| 5,841,366 | A * | 11/1998 | Yamamoto et al. | 340/901 |
| 6,226,571 | B1 * | 5/2001 | Kai | 701/1 |
| 2002/0154217 | A1 * | 10/2002 | Ikeda | 348/148 |
| 2003/0141966 | A1 * | 7/2003 | Strumolo et al. | 340/435 |
| 2005/0179580 | A1 * | 8/2005 | Cong et al. | 342/70 |
| 2005/0216181 | A1 * | 9/2005 | Estkowski et al. | 701/200 |
| 2006/0085131 | A1 * | 4/2006 | Yopp et al. | 701/301 |
| 2007/0043502 | A1 * | 2/2007 | Mudalige et al. | 701/207 |
| 2007/0150196 | A1 * | 6/2007 | Grimm | 701/301 |
| 2010/0250064 | A1 * | 9/2010 | Ota et al. | 701/36 |

FOREIGN PATENT DOCUMENTS

| | | |
|---|---|---|
| JP | 6-258438 | 9/1994 |
| JP | 11-345394 | 12/1999 |
| JP | 2000-343980 | 12/2000 |
| JP | 2004-295620 | 10/2004 |
| JP | 2005-010092 | 1/2005 |

* cited by examiner

*Primary Examiner* — Khoi Tran
*Assistant Examiner* — Dale Moyer
(74) *Attorney, Agent, or Firm* — Brinks Gilson & Lione (57) ABSTRACT

A road configuration identifying device properly identifies the road configuration around a user's vehicle. A reliability level indicating whether the traveling paths of other vehicles in an area behind the user's vehicle which are detected by a radar positioning system, which are obtained by tracking other vehicles using an other vehicle tracking section, and the traveling path of the user's vehicle are traveling paths along the same road configuration is calculated by using the velocity v, acceleration dv, angular velocity dθ, and the operation state of a direction indicator or the like of each vehicle. Then, the road configuration indicated by traveling paths having a high reliability level is predicted as the road configuration in the area behind the user's vehicle. A warning device evaluates the possibility of other vehicles colliding with the user's vehicle based on the road configuration of the area behind the user's vehicle predicted by the road configuration predicting section and the behavior of other vehicles tracked by the other vehicle tracking section, and warns of the possibility of collision if such another vehicle is present.

23 Claims, 6 Drawing Sheets

FIG.2

TABLE OF EVALUATION SUBJECT STATE ITEMS

| | ITEMS TO BE EVALUATED | EVALUATION VALUE CALCULATION METHOD |
|---|---|---|
| TRAVELING STATE ITEMS GROUP | VELOCITY v | H WHEN VALUE IS MORE THAN v1 AND LESS THAN v2 (v1<v2), L(L<H) FOR OTHER VALUES |
| | ACCELERATION dv | H WHEN VALUE IS LESS THAN dv1, L(L<H) FOR OTHER VALUES |
| | ANGULAR VELOCITY dθ | H WHEN VALUE IS LESS THAN dθ1, L(L<H) FOR OTHER VALUES |
| | ... | ... |
| OPERATION STATE ITEMS GROUP | DIRECTION INDICATOR OPERATION STATE | L WHEN DIRECTION INDICATOR IS BLINKING, H(L<H) FOR OTHER VALUES |
| | ... | ... |
| ENVIRONMENTAL STATE ITEMS GROUP | WHETHER OR NOT TRAVELING NEAR INTERSECTION | L WHEN VEHICLE IS NEAR INTERSECTION, H(L<H) FOR OTHER VALUES |
| | ... | ... |
| DETECTION CERTAINTY STATE ITEMS GROUP | NUMBER OF RECENT SUCCESSFUL TRACKINGS | L WHEN VALUE IS n OR LESS, M(L<M) WHEN MORE THAN n AND LESS THAN m(n<m), H(M<H) WHEN m OR MORE, BUT USER'S VEHICLE ALWAYS TAKES H |
| | ... | ... |

| ITEMS TO BE EVALUATED | USER'S VEHICLE | ANOTHER VEHICLE A | ANOTHER VEHICLE B | ANOTHER VEHICLE C |
|---|---|---|---|---|
| VELOCITY v | H | H | H | H |
| ACCELERATION dv | H | L | L | H |
| ANGULAR VELOCITY dθ | H | H | H | H |
| DIRECTION INDICATOR OPERATION STATE | H | H | H | H |
| WHETHER OR NOT TRAVELING NEAR INTERSECTION | H | H | H | H |
| NUMBER OF RECENT SUCCESSFUL TRACKINGS | H | L | H | H |
| RELIABILITY LEVEL | HIGH | LOW | HIGH | HIGH |
| ROAD CONFIGURATION | S | S | S | S |

FIG. 4(b2)

| ITEMS TO BE EVALUATED | USER'S VEHICLE | ANOTHER VEHICLE A | ANOTHER VEHICLE B | ANOTHER VEHICLE C |
|---|---|---|---|---|
| VELOCITY v | H | H | H | H |
| ACCELERATION dv | L | L | H | H |
| ANGULAR VELOCITY dθ | H | H | H | H |
| DIRECTION INDICATOR OPERATION STATE | H | H | H | H |
| WHETHER OR NOT TRAVELING NEAR INTERSECTION | H | H | H | H |
| NUMBER OF RECENT SUCCESSFUL TRACKINGS | LOW | HIGH | HIGH | HIGH |
| RELIABILITY LEVEL | R | S | S | S |
| ROAD CONFIGURATION | | | | |

FIG. 4(c2)

| ITEMS TO BE EVALUATED | USER'S VEHICLE | ANOTHER VEHICLE A | ANOTHER VEHICLE B | ANOTHER VEHICLE C |
|---|---|---|---|---|
| VELOCITY v | H | H | H | H |
| ACCELERATION dv | L | H | L | L |
| ANGULAR VELOCITY dθ | L | H | H | H |
| DIRECTION INDICATOR OPERATION STATE | H | H | H | H |
| WHETHER OR NOT TRAVELING NEAR INTERSECTION | H | H | H | H |
| NUMBER OF RECENT SUCCESSFUL TRACKINGS | LOW | HIGH | HIGH | HIGH |
| RELIABILITY LEVEL | S | | L | L |
| ROAD CONFIGURATION | | | | |

FIG. 5

ON-VEHICLE ROAD CONFIGURATION IDENTIFYING DEVICE

RELATED APPLICATION

The present application claims priority to Japanese Patent Application Number 2006-134721, filed May 15, 2006, the entirety of which is hereby incorporated by reference.

BACKGROUND OF THE INVENTION

1. Field of the Invention

The present invention relates to technology for identifying the road configuration around a user's own vehicle.

2. Description of the Related Art

As an example of technology for identifying the road configuration around a user's vehicle, there is known a system for identifying the road configuration behind a user's vehicle based on the traveling path of the vehicle (Japanese Patent Laid-Open No. 6-258438 publication, for example). However, this technology has a problem that it cannot identify the road configuration behind the user's vehicle properly if the vehicle's movement is inconsistent with the road configuration, such as when changing a traveling lane or entering a facility off the road.

SUMMARY OF THE INVENTION

Therefore, it is an object of the present invention to identify the road configuration around the user's own vehicle more accurately.

To achieve the object, the present invention is a road configuration identifying device mounted on a vehicle which identifies the road configuration around the vehicle, and the device includes: a traveling path detecting section that detects the traveling path of each other vehicle around a user's vehicle as a subject vehicle; a certainty level calculating section that calculates the certainty that a subject vehicle is traveling along a road according to a previously established evaluation method; and a road configuration predicting section that predicts the road configuration around the user's vehicle as the road configuration relating to a subject vehicle having a high certainty level calculated by the certainty level calculating section, based on the assumption that traveling paths detected by the traveling path detecting section are paths along the road network.

Such an on-vehicle road configuration identifying device can predict the road configuration around the user's vehicle according to the traveling path of a subject vehicle having a high certainty of a traveling path along the road configuration out of other vehicles around the user's vehicle, so that it becomes possible to properly identify the road configuration around the user's vehicle with higher reliability.

The subject vehicles may include the user's vehicle in addition to other vehicles around the user's vehicle. By predicting the road configuration taking the traveling path of the user's vehicle into consideration, it becomes possible to predict the road configuration with higher accuracy and higher reliability.

Further, in the above-described on-vehicle road configuration identifying device, the traveling path detecting section may detect the traveling path of another vehicle as a subject vehicle based on the positions of other vehicles around the user's vehicle relative to the user's vehicle, which are detected by using radar. In the case where the user's vehicle is included as a subject vehicle in addition to other vehicles around user's vehicle, the traveling path detecting section may be constituted by the other vehicle traveling path detecting section that detects the traveling path of another vehicle as a subject vehicle based on the positions of other vehicles around the user's vehicle relative to the user's vehicle, which are detected by using radar, and the user's vehicle traveling path detecting section that detects the traveling path of the user's vehicle as a subject vehicle from a user's vehicle positions detected by using a satellite positioning system or a sensor that detects the traveling state of the user's vehicle.

The above-described on-vehicle road configuration identifying device may regard as a subject vehicle each of the other vehicles around the user's vehicle that is positioned behind the user's vehicle, and the road configuration predicting section may predict the road configuration behind the user's vehicle. More specifically, the above-described on-vehicle road configuration identifying device may be provided with a behavior detecting section that detects the traveling behavior of each of the subject vehicles, and the certainty level calculating section may calculate the certainty that each subject vehicle is traveling along a road according to the evaluation method for evaluating the certainty of the subject vehicle corresponding to the behavior of the subject vehicle detected by the behavior detecting section. In this case, the certainty level calculating section may calculate the certainty that each subject vehicle is traveling along a road according to the evaluation method that the certainty of the subject vehicle is made larger as a velocity change of the subject vehicle is smaller, may calculate the certainty that each subject vehicle is traveling along a road according to the evaluation method that the certainty of the subject vehicle is made larger as a forward direction change of the subject vehicle is smaller, or in the case where the traveling velocity of the subject vehicle is within a predetermined range, may calculate the certainty that each subject vehicle is traveling along a road according to the evaluation method that the certainty of the subject vehicle is made larger than in other cases. This makes it possible to predict the road configuration with high reliability based on a subject vehicle that is stably traveling, that is, a vehicle considered to have a high probability of traveling along a road.

Further, the above-described on-vehicle road configuration identifying device may be provided with a direction indicator state detecting section that detects whether the direction indicator of each of the subject vehicles is blinking, and in the case where the direction indicator state detecting section detects that the direction indicator of a subject vehicle is blinking, the certainty level calculating section may calculate the certainty that the subject vehicle is traveling along a road according to the evaluation method that the certainty of the subject vehicle is made smaller than in other cases. This makes it possible to prevent the prediction of an incorrect road configuration on the basis of the behavior of a subject vehicle making a turnaround or course change, not dependent on road configuration.

Further, said traveling path detecting section of the above-described on-vehicle road configuration identifying device may be provided with an other vehicle position detecting section that detects the positions of other vehicles around the user's vehicle relative to the user's vehicle; an other vehicle tracking section that tracks other vehicles around the user's vehicle based on the relative positions of other vehicles detected by the other vehicle position detecting section; and an other vehicle traveling path detecting section that detects the traveling paths of other vehicles as subject vehicles based on a history of the relative positions of other vehicles tracked by the other vehicle tracking section, and the certainty level calculating section may calculate the certainty that each other vehicle as a subject vehicle is traveling along a road according to the evaluation method that the certainty of the subject vehicle is made larger if the frequency that the other vehicle tracking section succeeded in tracking the other vehicle as a subject vehicle is higher.

Generally, in the case of tracking other vehicles around a user's vehicle, the higher the frequency of successful tracking becomes, the higher the accuracy of relative positions and traveling paths found for the other vehicles becomes. Therefore, this makes it possible to perform highly reliable road configuration prediction in which the accuracy of traveling paths calculated for other vehicles around the user's vehicle is taken in consideration.

Furthermore, the above-described on-vehicle road configuration identifying device may be provided with position calculating means for calculating the position of each of the subject vehicles; and intersection presence/absence detecting means for detecting whether or not an intersection is present near the subject vehicle based on the position of the subject vehicle calculated by the position calculating means and map data, and in the case where the intersection presence/absence detecting means detects that an intersection is present near the subject vehicle, the certainty level calculating section may calculate the certainty that the subject vehicle is traveling along a road according to the evaluation method that the certainty of the subject vehicle is made smaller than in other cases. This makes it possible to prevent the prediction of an incorrect road configuration by the behavior of a vehicle near an intersection, which may not be dependent on the road configuration.

As described, according to the present invention, the road configuration around the user's vehicle can be identified more accurately.

DESCRIPTION OF THE PREFERRED EMBODIMENTS

Figures 1A, 1B:
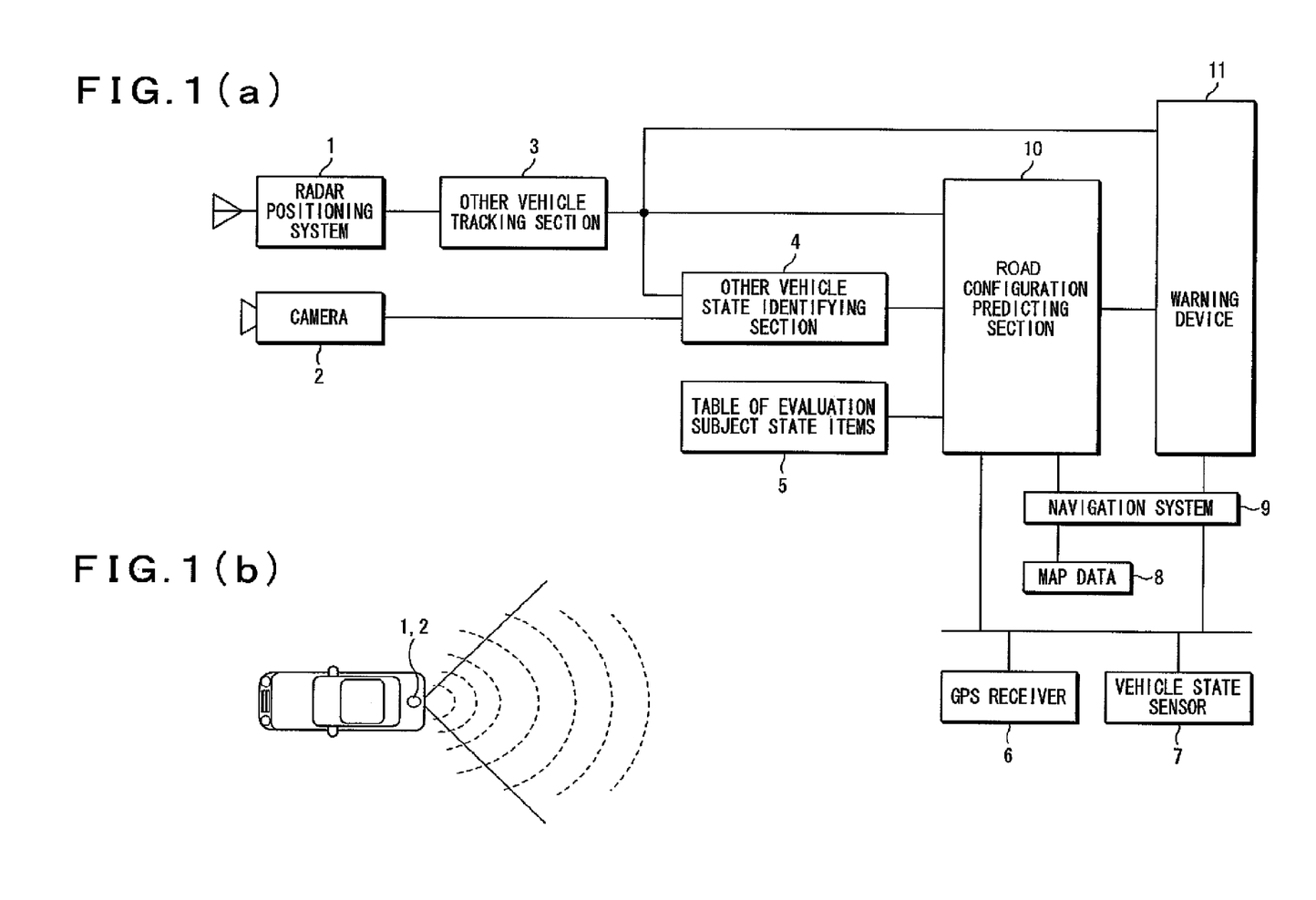
FIG. 1 is a block diagram of the on-vehicle system according to an embodiment of the present invention.

FIG. 1(a) shows the configuration of an on-vehicle system according to one embodiment.

The on-vehicle system is a device mounted on a vehicle, and includes a radar positioning system 1, a camera 2, an other vehicle tracking section 3, an other vehicle state identifying section 4, a table of evaluation subject state items 5, a GPS receiver 6, a vehicle state sensor 7, map data 8, a navigation system 9, a road configuration predicting section 10, and a warning device 11 as shown in the drawing. Here, the vehicle state sensor 7 is a collection of sensors that detects various states of the user's vehicle, such as a vehicle velocity sensor that detects the velocity of the vehicle, a gyro sensor that detects the angular velocity of the vehicle, and a sensor that detects the operation state of the direction indicator of the vehicle.

As shown in FIG. 1(b), the radar positioning system 1 is positioned at the rear of the vehicle, performs scanning for detecting the positions and the velocity vectors of other vehicles, which are present within a scan range, relative to the user's vehicle by using the backward direction of the user's vehicle as the scan range, and repeats the process of producing measurement data on the relative positions and the relative velocity vectors detected by the scanning. Further, the camera 2 is also positioned at the rear of the vehicle and photographs an area behind the user's vehicle.

Based on the measurement data produced by the radar positioning system 1, the other vehicle tracking section 3 tracks each of the other vehicles that are present in the area behind the user's vehicle, and repeatedly performs other vehicle tracking processing for generating and managing tracking information for each of the other vehicles that are being tracked. Here, the tracking of other vehicles includes the process of putting measurement data measured at each point into series as time series measurement data of other vehicles for each of the other vehicles. Further, the tracking information of one of the other vehicles being tracked denotes the time series measurement data of other vehicles being tracked, which was put into series in this manner.

The other vehicle tracking processing performs the tracking of other vehicles as described below. Specifically, in the case where measurement data indicating the relative positions and the relative velocity vectors that are approximate to the current relative positions and relative velocity vectors of other vehicles being tracked, which are predicted from the past measurement data of the other vehicles being tracked, are present in the measurement data produced by the radar positioning system 1, the measurement data is added to the tracking information of the other vehicles being tracked as measurement data of the other vehicles being tracked. In the case where measurement data not related to the measurement data of other vehicles being tracked is present in the measurement data produced by the radar positioning system 1, tracking information of another vehicle is generated assuming that the vehicle is a new vehicle being tracked, and the new measurement data is added to the tracking information of the new vehicle being tracked. Further, in the other vehicle tracking processing, when measurement data of another vehicle being tracked has been previously measured continuously in plural times of scanning but has ended, the tracking information of the other vehicle being tracked is deleted.

The navigation system 9 calculates the current position of the user's vehicle while referring to the map data 8 and the output from the GPS receiver 6 and the vehicle state sensor 7. Note that the map data 8 indicates roads as continuous pairs of straight lines (links), and generally speaking, an error of a road configuration indicated by the map data 8 to an actual road configuration is relatively large.

The other vehicle state identifying section 4 detects the state of each of the other vehicles being tracked, which are the other vehicles being tracked by the other vehicle tracking section 3, from images photographed by the camera 2. The other vehicle state identifying section 4 detects the blinking state of the direction indicator or the like of other vehicles as the state of the other vehicles, for example.

More specifically, the other vehicle state identifying section 4 performs the following processing for each of the other vehicles being tracked. In particular, the other vehicle state identifying section obtains the latest relative positions of the other vehicles being tracked from tracking information that the other vehicle tracking section 3 manages for the other vehicles being tracked, and calculates positions in the image photographed by the camera 2 where the obtained relative positions are shown. Further, the other vehicle state identifying section applies image recognition processing to an area around the calculated positions in the image photographed by the camera 2, and extracts the image patterns of the other vehicles being tracked. Then, in the extracted image patterns of the other vehicles being tracked in the last predetermined period, a state of whether or not direction indicators of the other vehicles being tracked are blinking is detected based on whether or not the brightness of an area corresponding to the direction indicator is changing periodically.

Figure 2:
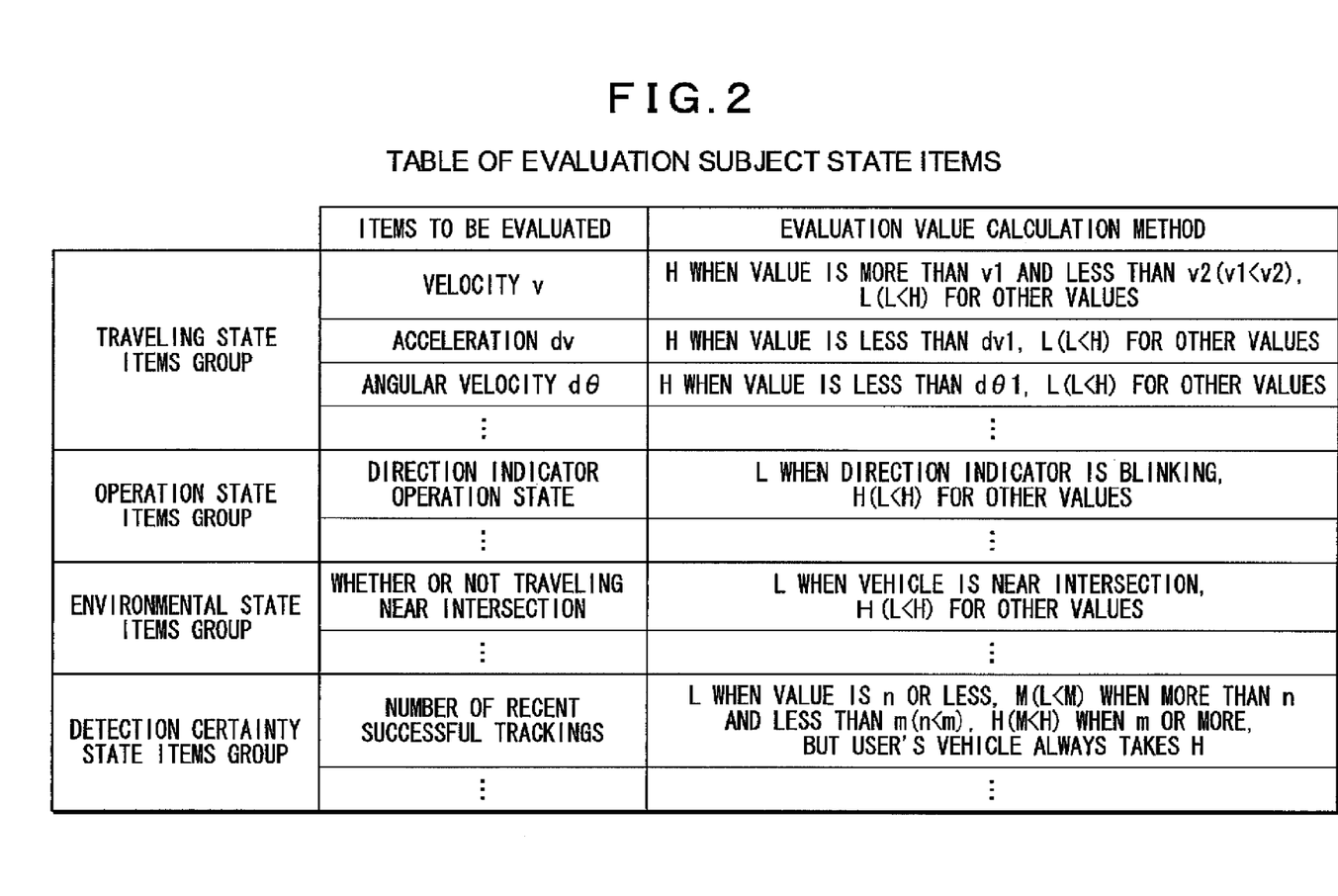
FIG. 2 illustrates the contents of a table of evaluation subject state items according to an embodiment of the present invention.

FIG. 2 shows the contents of the table of evaluation subject state items 5. As shown, the table of evaluation subject state items 5 is a table that defines how the state of the user's vehicle and the other vehicles is evaluated, and it includes an entry for each item to be evaluated. In an entry, a definition as to how the item should be evaluated is registered as an evaluation value calculation method that indicates a method of calculating evaluation values indicating the evaluation results.

As shown in the drawing, in this embodiment there are provided a group of items to be evaluated related to the traveling state of a vehicle, a group of items to be evaluated related to the operation state of a vehicle, a group of items to be evaluated related to the surrounding environmental state of a vehicle, and a group of items to be evaluated related to the detection certainty level state that is a certainty state of detected information concerning a vehicle.

In the group of items to be evaluated related to the traveling state of a vehicle, velocity v, acceleration dv, angular velocity dθ and the like are provided. The velocity v indicates the velocity state of a vehicle, and when the vehicle travels at a general velocity vn (v1<vn<v2), the evaluation value is calculated as H, and is calculated as L(H>L) in other cases as reflected in the evaluation value calculation method for the entry of velocity v in the table. The acceleration dv indicates the velocity change state of a vehicle, and when the vehicle is not making a sudden acceleration or a sudden slowdown (when the velocity change is less than a predetermined value dv1), the evaluation value is calculated as H, and as L(H>L) in other cases as reflected in the evaluation value calculation method for the entry of acceleration dv in the table. The angular velocity dθ shows the direction change state of the vehicle, and when the vehicle is traveling substantially straight (when the direction change is less than a predetermined value dθ1), the evaluation value is calculated as H, and as L(H>L) in other cases as reflected in the evaluation value calculation method for the entry of angular velocity dθ in the table.

In the group of items to be evaluated related to the operation state of a vehicle, a direction indicator operation state or the like is provided. The direction indicator operation state shows the operation state of the direction indicator of the vehicle, and when the direction indicator is in an operated state (where the direction indicator is blinking), the evaluation value is calculated as L, and is calculated as H(H>L) in other cases as reflected in the evaluation value calculation method for the entry of the direction indicator operation state in the table.

In the group of items to be evaluated related to the surrounding environmental state of the vehicle, "whether or not traveling near intersection" or the like is provided. The "whether or not traveling near intersection" item shows the state of whether or not the vehicle is traveling near an intersection, and when the vehicle is traveling near an intersection, the evaluation value is calculated as L, and is calculated as H(H>L) in other cases as reflected in the evaluation value calculation method for the corresponding entry in the table.

Finally, in the group of items to be evaluated related to the detection certainty level state, the number of recent successful trackings or the like is provided. The number of recent successful trackings identifies the number of times that the other vehicle tracking section 3 succeeded in tracking a vehicle in the last predetermined period. As reflected in the evaluation value calculation method for the entry of the number of recent successful trackings in the table, the evaluation value is calculated as L when the number of recent successful trackings is less than or equal to n, as M when it is greater than n or less than m(n<m), and as H(H>M>L) when it is m or more. However, since the tracking of the user's vehicle is not performed, the evaluation value is always calculated as H for the user's vehicle.

Note that the larger the above-described evaluation value of each item to be evaluated, the higher the evaluation of the item to be evaluated.

Now, returning to FIG. 1, the road configuration predicting section 10 performs road configuration prediction processing and predicts the road configuration behind a user's vehicle.

Figure 3:
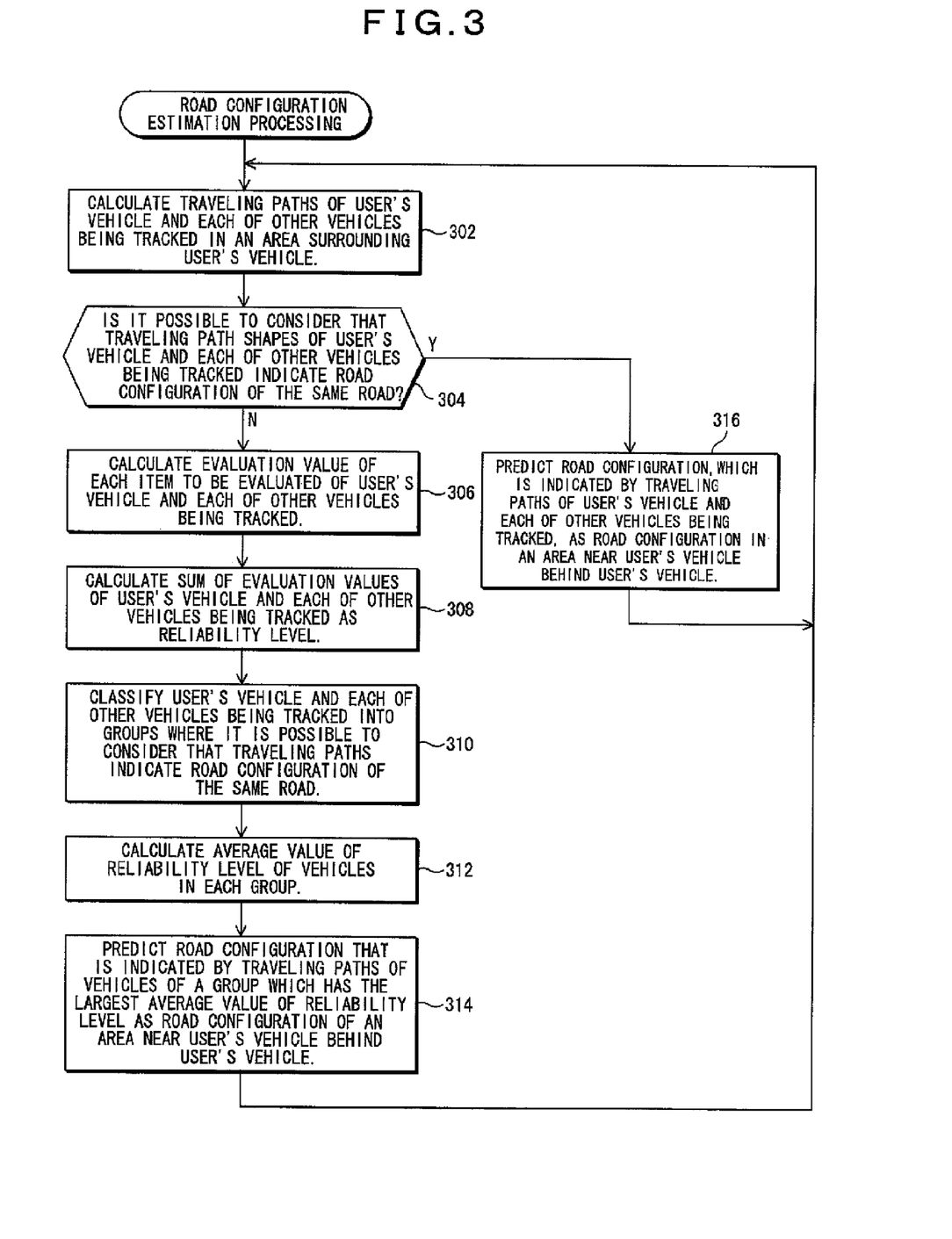
FIG. 3 is a flowchart of road configuration prediction processing according to an embodiment of the present invention.

FIG. 3 shows the procedure of the road configuration prediction processing. The road configuration predicting section 10 calculates traveling paths of the user's vehicle and other vehicles being tracked in a region surrounding the user's vehicle (step 302). The traveling path of the user's vehicle is calculated from the current position found by the GPS receiver 6 or the history of the current position found from the vehicle velocity and the angular velocity, which were detected by the vehicle state sensor 7. However, it is also possible to find the traveling path of the user's vehicle from the history of the current position calculated by the navigation system 9. On the other hand, the traveling path of each of the other vehicles being tracked is calculated from the history of the relative positions of the other vehicles being tracked at each point of time as indicated by the tracking information of each of the other vehicles being tracked and the positions of the other vehicles being tracked at each point of time, which are found relative to the current position of the user's vehicle at each point of time.

Next, whether or not it is possible to consider that all the calculated traveling paths of the user's vehicle and each of the other vehicles being tracked indicate the same road configuration is judged on the assumption that each traveling path is a path obtained by traveling along a road (step 304). More specifically, this judgment is performed based on the assumption that traveling paths, which are parallel within a predetermined distance of each other and do not include a portion that is not parallel, indicate the same road configuration, for example.

When it is possible to consider that the road configuration is of the same road, the road configuration indicated by the traveling paths of the user's vehicle and each of the other vehicles being tracked is predicted as the road configuration near the user's vehicle in an area behind the user's vehicle (step 316), and processing returns to step 302. In stop 316, more specifically, a belt shape of a fixed width containing the traveling paths of the user's vehicle and each of the other vehicles being tracked, which is parallel with the traveling paths of the user's vehicle and each of the other vehicles being tracked, is predicted as the road configuration in an area behind the user's vehicle, for example.

On the other hand, in the case where the road configuration indicated by the traveling paths of the user's vehicle and the other vehicles being tracked are not all the same, evaluation values of the items to be evaluated, which are registered with the table of evaluation subject state items 5, are calculated for the user's vehicle and each of the other vehicles being tracked according to the evaluation value calculation method described in the entry for the items to be evaluated (step 306). Out of the items to be evaluated, the velocity v, the acceleration dv, and the angular velocity dθ of the user's vehicle are found from the vehicle velocity and the angular velocity detected by the vehicle state sensor 7, and the direction indicator operation state of the user's vehicle is found from the operation state of the direction indicator detected by the vehicle state sensor 7. Further, whether or not the user's vehicle is traveling near an intersection is found using the navigation system 9. The navigation system 9, on receiving an inquiry, judges whether or not an intersection connected to the road on which the current position of the user's vehicle is located is present near the current position by referring to the map data 8, and provides the judgment result to the road configuration predicting section 10. Note that the velocity v, the acceleration dv, and the angular velocity dθ of the user's vehicle may be calculated from the history of the current position calculated by the navigation system 9. The velocity v, the acceleration dv, and the angular velocity dθ of each of the other vehicles being tracked are calculated based on the relative positions and the relative velocity vectors of the other vehicles being tracked at each point of time, as indicated by the tracking information of the other vehicles being tracked, and the position, the velocity vector or their changes of other vehicles at each point of time, which are found relative to the current position and the velocity vector of the user's vehicle at each point of time. Meanwhile, it is possible to find the velocity vector of the user's vehicle from the velocity and the forward direction of the user's vehicle, which is found from the history of the current position and the angular velocity of user's vehicle.

The direction indicator operation state of the other vehicles being tracked is found from the blinking state of the direction indicator of the other vehicles being tracked, which was identified from images that the other vehicle state identifying section 4 photographed using the camera 2. Whether or not the user's vehicle is traveling near an intersection is found by the navigation system 9 by determining whether or not an intersection is present near a position shown by the latest relative positions of other vehicles being tracked, which are indicated by the tracking information of the other vehicles being tracked. The navigation system 9, on receiving an inquiry, judges whether or not an intersection connected to a road on which the current position of the user's vehicle is positioned, is near a point that the current position of the user's vehicle moved by the amount of the relative position by referring to the map data 8, and provides a judgment result to the road configuration predicting section 10. Further, the number of recent successful trackings of the other vehicles being tracked can be found as the number of measurement data in a past predetermined period stored in the tracking information of the other vehicles being tracked.

Once the evaluation values of items to be evaluated, which are registered with the table of evaluation subject state items 5, are calculated for the user's vehicle and each of the other vehicles being tracked, the reliability level is calculated for the user's vehicle and each of the other vehicles being tracked (step 308). The reliability level of the user's vehicle is obtained as a sum of evaluation values calculated for the user's vehicle, and the reliability level of other vehicles being tracked is obtained as a sum of evaluation values calculated for the other vehicles being tracked.

Next, the user's vehicle and other vehicles being tracked are classified into groups where it is possible to consider that traveling paths indicate the road configuration of the same road, assuming that each of the traveling paths is a path obtained by traveling along a road (step 310). Note that the classification into groups, more specifically, is performed based on the assumption that traveling paths, which are parallel within a predetermined distance of each other and do not include a portion that is not parallel, indicate the road configuration of the same road, for example.

Then, the average of the reliability level of each vehicle (user's vehicle or other vehicles being tracked) that belongs to each group is found (step 312), and a road configuration indicated by the traveling path of each vehicle (user's vehicle or other vehicles being tracked) that belongs to a group having the largest average reliability level is predicted as the road configuration near the user's vehicle of an area behind the user's vehicle (step 314), and processing returns to step 302. In step 314, more specifically, a belt shape of a fixed width containing the traveling paths of each vehicle which is parallel with the traveling paths of each vehicle that belongs to the group having the largest average of the reliability level, for example, is predicted as the road configuration of an area behind the user's vehicle.

Figure 4:
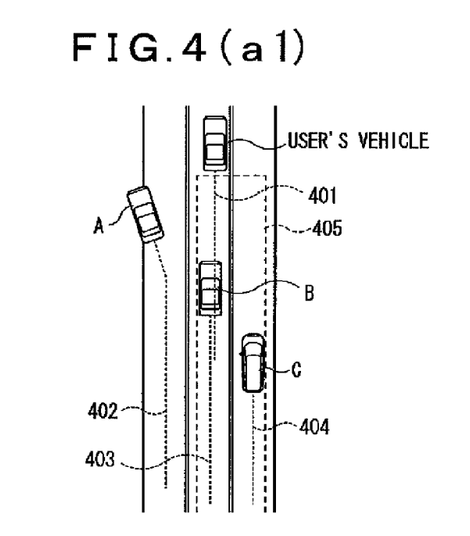
FIG. 4 illustrates examples of road configuration prediction processing according to an embodiment of the present invention.

The road configuration prediction processing has been described above. FIG. 4 shows examples of the road configuration prediction processing.

FIG. 4(*a*1) illustrates the case where another vehicle A, another vehicle B, and another vehicle C are present behind the user's vehicle; the user's vehicle, vehicle B, and vehicle C travel along the road; and vehicle A is about to proceed to a facility off the road. Further, it is assumed that vehicle A changed its velocity and direction considerably in order to proceed to the facility off the road.

In this case, the traveling path of a user's vehicle 401, the traveling path 403 of vehicle B, and the traveling path 404 of vehicle C express the same straight road configuration S, but the traveling path 402 of vehicle A indicates a left-curved road configuration L. Here, a predicted road configuration is based on the assumption that the traveling paths are obtained by traveling along the road network, as explained above.

In such a case, by classifying the vehicles into groups where it is possible to consider that traveling paths indicate the road configuration of the same road, the four vehicles are classified into a group containing the user's vehicle, vehicle B and vehicle C, and a group containing vehicle A. Further, the evaluation value and the reliability level which are obtained for each vehicle (user's vehicle, vehicle A, vehicle B, vehicle C) are as shown in FIG. 4(*a*2). The reliability level of vehicle A that proceeds to the facility off the road is reduced compared to the other vehicles because the evaluation values of the acceleration dv and the angular velocity dθ become small. As a result, the average value of the reliability level of the group containing the user's vehicle, vehicle B and vehicle C becomes the largest, and a straight road configuration 405 shown in FIG. 4(*a*1), which is indicated by the traveling paths of the user's vehicle, vehicle B and vehicle C, is finally predicted as the road configuration of an area behind the user's vehicle. Note that the road configuration 405 is a belt shape of a fixed width containing the traveling paths of the user's vehicle, vehicle B and vehicle C, and is parallel to the traveling paths of the user's vehicle, vehicle B and vehicle C, for example.

Next, FIG. 4(*b*1) illustrates the case where another vehicle A, another vehicle B and another vehicle C are present behind the user's vehicle; vehicle A, vehicle B and vehicle C travel along a road, and the user's vehicle makes a course change by changing its traveling lane. Further, it is assumed that the user's vehicle is changing course while accelerating as it blinks the direction indicator.

In this case, the traveling path 402 of vehicle A, the traveling path 403 of vehicle B, and the traveling path 404 of vehicle C indicate the same straight road configuration S, but the traveling path 401 of the user's vehicle indicates a right-curved road configuration R.

In such a case, by classifying the vehicles into groups where it is possible to consider whether traveling paths indicate the road configuration of the same road, the four vehicles are classified into a group containing vehicle A, vehicle B and vehicle C, and a group containing the user's vehicle. The evaluation value and the reliability level which are obtained for each vehicle (user's vehicle, vehicle A, vehicle B, vehicle C) are as shown in FIG. 4(b2). The reliability level of the user's vehicle that is making a course change is reduced compared to the other vehicles because the evaluation values of the acceleration dv, the angular velocity dθ and the direction indicator operation state are small. As a result, the average value of the reliability level of the group containing vehicle A, vehicle B and vehicle C becomes the largest, and a straight road configuration 406 shown in FIG. 4(b1), which is indicated by the traveling paths of vehicle A, vehicle B and vehicle C, is finally predicted as the road configuration of an area behind the user's vehicle. Note that the road configuration 406 is a belt shape of a fixed width containing the traveling paths of vehicle A, vehicle B and vehicle C, and is parallel with the traveling paths of vehicle A, vehicle B and vehicle C, for example.

Next, FIG. 4(c1) illustrates the case where another vehicle A, another vehicle B and another vehicle C are present behind the user's vehicle; vehicle A, vehicle B and vehicle C travel along a road, and the user's vehicle is about to proceed to a facility off the road. Further, it is assumed that the user's vehicle is proceeding off the road while slowing down as it operates the direction indicator.

In this case, the traveling path 402 of vehicle A, the traveling path 403 of vehicle B, and the traveling path 404 of vehicle C indicate the same left-curved road configuration L, but the traveling path 401 of the user's vehicle indicates a straight road S.

In such a case, by classifying the vehicles into groups where it is possible to consider whether traveling paths indicate the road configuration of the same road, the four vehicles are classified into a group containing vehicle A, vehicle B and vehicle C; and a group containing the user's vehicle. The evaluation value and the reliability level which are obtained for each vehicle (user's vehicle, vehicle A, vehicle B, vehicle C) are as shown in FIG. 4(c2). For the user's vehicle that is about to proceed to a facility off the road, the evaluation values of the acceleration dv and the direction indicator operation state become small compared to the other vehicles, and the evaluation value of the angular velocity dθ becomes larger than the other vehicles because the user's vehicle travels straight instead of turning to the left along the road configuration. As a result, the sum of the reliability levels of the user's vehicle becomes smaller than that of the other vehicles, and the average value of the reliability levels of the group containing vehicle A, vehicle B and vehicle C becomes the largest. Thus, a left-curved road configuration 407 in FIG. 4(c1), which is indicated by the traveling paths of vehicle A, vehicle B and vehicle C, is finally predicted as the road configuration of an area behind the user's vehicle. Note that the road configuration 407 is found as a belt shape of a fixed width containing the traveling paths of vehicle A, vehicle B and vehicle C, and is parallel with the traveling paths of vehicle A, vehicle B and vehicle C, for example.

As described above, the reliability level calculated for the user's vehicle or other vehicles being tracked indicates the reliability level that the vehicle is traveling along a road. Therefore, according to the above-described road prediction processing, it is possible to predict the road configuration around the user's vehicle based on the traveling paths of other vehicles in the area behind the user's vehicle which have a high reliability of traveling along the same road configuration, and as a result, the road configuration around the user's vehicle can be properly identified with a higher reliability level. More specifically, by using the above-described evaluation values of the group of items to be evaluated related to the traveling state of a vehicle in calculating the reliability level, the road configuration can be predicted based on a subject vehicle that is stably traveling, that is, the vehicle having a high probability of traveling along a road. Further, by providing the direction indicator operation state as an item to be evaluated and using its evaluation value in calculating the reliability level, it becomes possible to prevent the prediction of an incorrect road configuration by the behavior of a vehicle performing a turnaround or course change, not dependent on the road configuration. Further, by providing "whether or not traveling near intersection" as an item to be evaluated and using its evaluation value in calculating the reliability level, it becomes possible to prevent the prediction of an incorrect road configuration by the behavior of a subject vehicle near an intersection not dependent on road configuration. Further, by providing the number of recent successful trackings as an item to be evaluated and using its evaluation value in calculating the reliability level, the prediction of a road configuration, in which the reliability of traveling paths calculated for other vehicles around the user's vehicle is taken in consideration, can be performed.

Returning to FIG. 1, the warning device 11 performs an approaching vehicle warning processing to warn a driver of the presence of other vehicles approaching the user's vehicle by using the road configuration that the road configuration predicting section 10 predicted in the manner described above.

Figure 5:
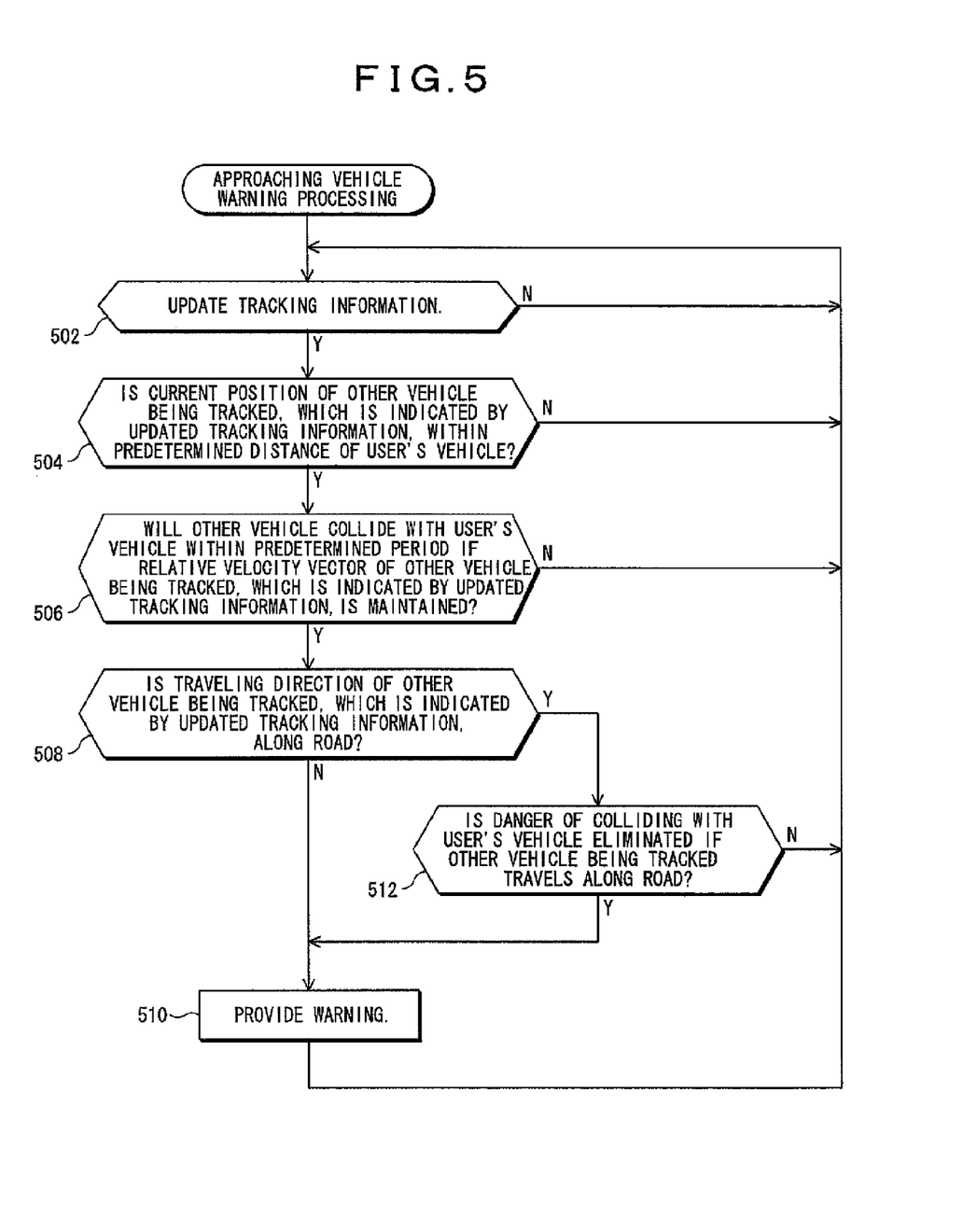
FIG. 5 is a flowchart of road configuration prediction processing according to an embodiment of the present invention.

FIG. 5 shows the procedure of the approaching vehicle warning processing. The warning device 11 monitors the updating of tracking information of the other vehicles being tracked, which is obtained by the other vehicle tracking section 3 (step 502). When any tracking information is updated, it is checked whether or not the current relative position of another vehicle being tracked based on the updated tracking information is within a predetermined distance of the user's vehicle (step 504). If it is not, processing returns to step 502 to wait for the occurrence of the next update of tracking information.

On the other hand, when the relative position of another vehicle being tracked is within the predetermined distance of the user's vehicle, the current relative velocity vector of the other vehicle being tracked is further obtained from the updated tracking information. Whether or not the other vehicle being tracked could collide with the user's vehicle within a predetermined period if the relative velocity vector is maintained is checked (step 506). In the case where the other vehicle being tracked will not collide with the user's vehicle within a predetermined period even if the relative velocity vector is maintained, processing returns to step 502 to wait for the occurrence of the next update of the tracking information.

In the case where the other vehicle being tracked will collide with the user's vehicle within a predetermined period if the relative velocity vector is maintained, whether or not the other vehicle is traveling along the road predicted by the road configuration predicting section 10 is judged from the traveling path of the other vehicle which is obtained from the updated tracking information (step 508). If it is not traveling along the road, the warning device warns the driver that there is an approaching vehicle by voice or display output (step 510). Then, processing returns to step 502 to wait for the occurrence of the next update of tracking information.

In the case where the other vehicle being tracked is traveling along the road predicted by the road configuration predicting section 10, it is checked whether the possibility of collision of the other vehicle with the user's vehicle within a predetermined period will not be eliminated even if the other vehicle being tracked keeps on traveling along the road predicted by the road configuration predicting section 10 (step 512). If such a possibility of collision is eliminated, processing returns to step 502 to wait for the occurrence of the next update of tracking information. On the other hand, if the possibility of collision of the other vehicle being tracked with the user's vehicle within a predetermined period will not be eliminated, the warning device warns the driver by voice or display output that there is an approaching vehicle (step 510). Then, processing returns to step 502 to wait for the occurrence of the next update of tracking information.

Figure 6A:
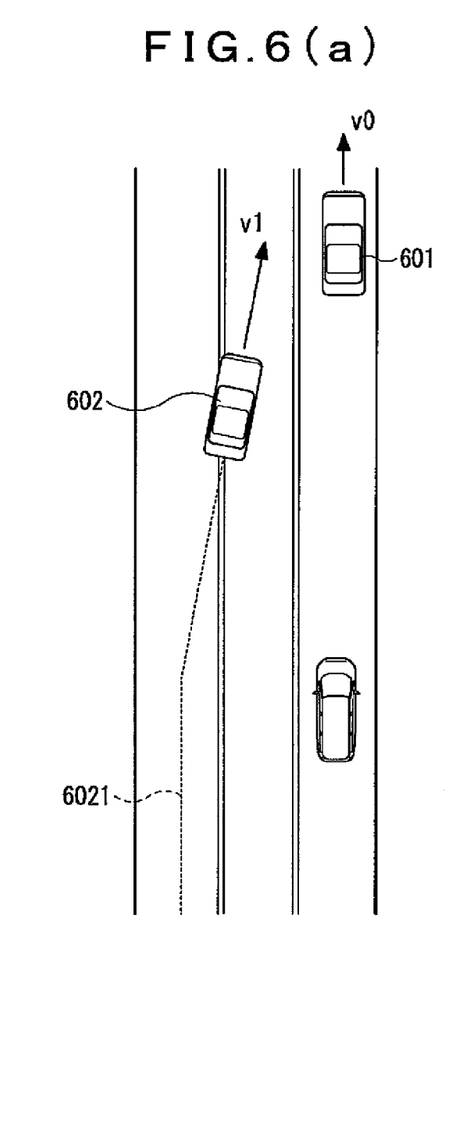
FIG. 6 illustrates an example of road configuration prediction processing according to an embodiment of the present invention.
Figure 6B:
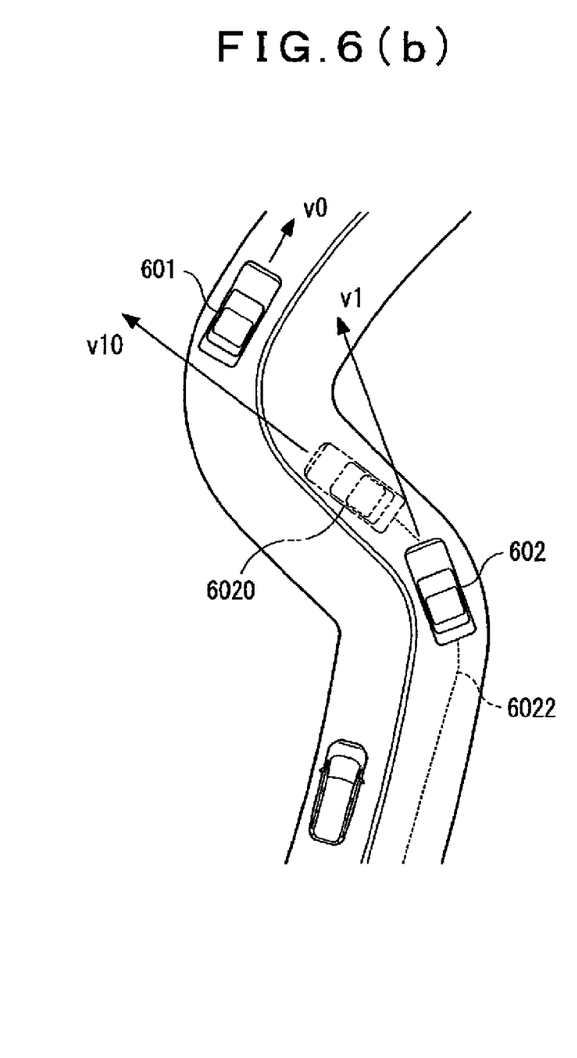

As shown in FIG. 6(*a*), according to such an approaching vehicle warning processing, in the case where a user's vehicle 601 traveling at velocity vector v0 and another vehicle being tracked 602 traveling at velocity vector v1, which has a traveling path 6021 not extending along the road configuration, are present, if the other vehicle being tracked 602 will collide with the user's vehicle within a predetermined period when the relative velocity vector of the other vehicle being tracked 602, which is found as a difference vector between velocity vector v0 and velocity vector v1, is maintained, a warning of a possible collision will be provided to the driver.

However, as shown in FIG. 6(*b*), even if another vehicle being tracked 602 will collide with the user's vehicle within a predetermined period if the relative velocity vector of the other vehicle being tracked 602 is maintained, it is very possible that the other vehicle being tracked 602 will continue traveling along the road in the case where the other vehicle being tracked 602 is traveling on a traveling path 6022 along the road. Therefore, it is checked whether the danger of the other vehicle being tracked 602 colliding with the user's vehicle will not be eliminated within a predetermined period even if the other vehicle being tracked 602 continues traveling along the road. Then, a warning will be provided only when the danger of collision is not eliminated.

In the case shown in FIG. 6(*b*), if the other vehicle being tracked 602 continues traveling along the road, the other vehicle being tracked 602 will arrive at the position 6020, the direction of the velocity vector becomes v10, and the danger of the other vehicle being tracked 602 colliding with the user's vehicle within a predetermined period is eliminated. Therefore, a warning is not provided to the driver in this case.

According to the above-described approaching vehicle warning processing, the danger of another vehicle colliding with the user's vehicle can be evaluated with good accuracy, and a warning based on the evaluation can be given to the driver.

Although the above-described embodiment used the road configuration predicted by the road configuration predicting section 10 in providing a warning of another vehicle approaching the user's vehicle by using the warning device 11, the road configuration predicted by the road configuration predicting section 10 may be used for various other types of processing. For example, in the case where the predicted road configuration is different from a road configuration indicated by the map data 8, the predicted road configuration may be used for calibrating the road configuration indicated by the map data 8.

Further, although description has been made for the case of predicting the road configuration behind the user's vehicle, this embodiment also can be applied to the case of predicting the road configuration ahead of the user's vehicle by switching "ahead" and "behind" in the foregoing description. However, in this case, the traveling path of the user's vehicle is not used, but a road configuration indicated by the traveling paths of other vehicles being tracked in a group, which has a large average value of the reliability level, out of groups of other vehicles being tracked, which have traveling paths that can be considered to indicate the same road configuration, is predicted as the road configuration ahead of the user's vehicle. Further, the road configuration ahead of a user's vehicle predicted in this manner can be used for pre-announcing a condition ahead, such as a curve ahead.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle road configuration identifying device mounted on a user's vehicle, which identifies the road configuration near said user's vehicle, said device comprising:
    a traveling path detecting section that is configured to detect the traveling path of at least one subject vehicle, where said at least one subject vehicle includes at least one vehicle near the user's vehicle;
    a certainty level calculating section that is configured to calculate for each subject vehicle a level of certainty that the subject vehicle is traveling along a road; and
    a road configuration predicting section that is configured to predict as a road configuration near the user's vehicle the road configuration for at least one of said subject vehicles having a certainty level calculated by said certainty level calculating section that is higher than a certainty level calculated by said certainty level calculating section for at least one other of said subject vehicles.

2. The on-vehicle road configuration identifying device according to claim 1,
    wherein said traveling path detecting section is configured to detect the traveling path of a vehicle other than the user's vehicle as a subject vehicle based on the position of said other vehicle relative to the user's vehicle, which is detected by using radar.

3. The on-vehicle road configuration identifying device according to claim 1, comprising:
    a behavior detecting section that is configured to detect the traveling behavior of each subject vehicle,
    wherein said certainty level calculating section is configured to calculate the certainty that a subject vehicle is traveling along a road based on at least the behavior of said subject vehicle detected by said behavior detecting section.

4. The on-vehicle road configuration identifying device according to claim 3, wherein said certainty level calculating section is configured to calculate the certainty that a subject vehicle is traveling along a road such that said certainty of the subject vehicle is made larger as a velocity change of said subject vehicle is smaller.

5. The on-vehicle road configuration identifying device according to claim 3,
wherein said certainty level calculating section is configured to calculate the certainty that a subject vehicle is traveling along a road such that said certainty of the subject vehicle is made larger as a forward direction change of said subject vehicle is smaller.

6. The on-vehicle road configuration identifying device according to claim 3,
wherein, in the case where the traveling velocity of a subject vehicle is within a predetermined range, said certainty level calculating section is configured to calculate the certainty that said subject vehicle is traveling along a road such that said certainty of said subject vehicle is made larger than in other cases.

7. The on-vehicle road configuration identifying device according to claim 1, comprising:
a direction indicator state detecting section that is configured to detect whether a direction indicator of a subject vehicle is operated,
wherein, in the case where said direction indicator state detecting section detects that the direction indicator of a subject vehicle is operated, said certainty level calculating section is configured to calculate the certainty that the subject vehicle is traveling along a road such that said certainty of the subject vehicle is made smaller than in other cases.

8. The on-vehicle road configuration identifying device according to claim 1,
wherein said traveling path detecting section comprises an other vehicle position detecting section that is configured to detect the positions of vehicles other than the user's vehicle near the user's vehicle relative to the user's vehicle; an other vehicle tracking section that is configured to track vehicles other than the user's vehicle near the user's vehicle based on the relative positions of said other vehicles detected by the other vehicle position detecting section; and an other vehicle traveling path detecting section that is configured to detect the traveling paths of said vehicles other than the user's vehicle based on a history of the relative positions of said other vehicles tracked by the other vehicle tracking section, and
wherein said certainty level calculating section is configured to calculate the certainty that a subject vehicle is traveling along a road such that said certainty of the subject vehicle is made larger as the frequency that the other vehicle tracking section succeeded in tracking the vehicle increases.

9. The on-vehicle road configuration identifying device according to claim 1, comprising:
position calculating means for calculating the position of a subject vehicle; and
intersection detecting means for detecting whether or not an intersection is present near a subject vehicle based on the position of said subject vehicle calculated by said position calculating means and map data,
wherein, in the case where said intersection detecting means detects that an intersection is present near a subject vehicle, said certainty level calculating section calculates the certainty that said subject vehicle is traveling along a road such that said certainty of the subject vehicle is made smaller than in other cases.

10. The on-vehicle road configuration identifying device according to claim 1, comprising:
a warning device to provide a warning of a potential collision between the user's vehicle and another vehicle near the user's vehicle, based on the predicted road configuration near the user's vehicle.

11. An on-vehicle road configuration identifying device mounted on a user's vehicle, which identifies the road configuration near said user's vehicle, said device comprising:
a traveling path detecting section that is configured to detect the traveling path of at least one subject vehicle, where said at least one subject vehicle includes at least one vehicle near said user's vehicle;
a certainty level calculating section that is configured to calculate for each subject vehicle a level of certainty that the subject vehicle is traveling along a road; and
a road configuration predicting section that is configured to predict as a road configuration near the user's vehicle the road configuration for at least one of said subject vehicles having a certainty level calculated by said certainty level calculating section that is higher than a certainty level calculated by said certainty level calculating section for at least one other of said subject vehicles;
wherein said at least one subject vehicle includes the user's vehicle in addition to said at least one vehicle near the user's vehicle.

12. The on-vehicle road configuration identifying device according to claim 11,
wherein said traveling path detecting section comprises:
an other vehicle traveling path detecting section that is configured to detect the traveling paths of vehicles other than the user's vehicle as subject vehicles based on the positions of said other vehicles near the user's vehicle relative to the user's vehicle, which are detected by radar; and
a user's vehicle traveling path detecting section that is configured to detect the traveling path of the user's vehicle as a subject vehicle from the position of the user's vehicle detected by one of a satellite positioning system and a sensor that detects the traveling state of the user's vehicle.

13. The on-vehicle road configuration identifying device according to claim 11,
wherein said at least one vehicle near a user's vehicle is a vehicle located behind the user's vehicle, and
wherein said road configuration predicting section predicts the road configuration behind the user's vehicle.

14. The on-vehicle road configuration identifying device according to claim 11, comprising:
a behavior detecting section that is configured to detect the traveling behavior of each subject vehicle,
wherein said certainty level calculating section is configured to calculate the certainty that a subject vehicle is traveling along a road based on at least the behavior of the subject vehicle detected by said behavior detecting section.

15. The on-vehicle road configuration identifying device according to claim 14,
wherein said certainty level calculating section is configured to calculate the certainty that each subject vehicle is traveling along a road such that said certainty of the subject vehicle is made larger when a velocity change of the subject vehicle is smaller.

16. The on-vehicle road configuration identifying device according to claim 14, wherein said certainty level calculating section is configured to calculate the certainty that each subject vehicle is traveling along a road such that said certainty of the subject vehicle is made larger when a forward direction change of the subject vehicle is smaller.

17. The on-vehicle road configuration identifying device according to claim 14,
wherein, in the case where the traveling velocity of a subject vehicle is within a predetermined range, said certainty level calculating section is configured to calculate the certainty that the subject vehicle is traveling along a road such that said certainty of the subject vehicle is made larger than in other cases.

18. The on-vehicle road configuration identifying device according to claim 11, comprising:
a direction indicator state detecting section that is configured to detect the operating state of a direction indicator of a subject vehicle,
wherein, in the case where said direction indicator state detecting section detects that the direction indicator of a subject vehicle is operated, said certainty level calculating section is configured to calculate the certainty that the subject vehicle is traveling along a road such that said certainty of the subject vehicle is made smaller than in other cases.

19. The on-vehicle road configuration identifying device according to claim 11,
wherein said traveling path detecting section comprises an other vehicle traveling path detecting section that is configured to detect the traveling paths of vehicles other than the user's vehicle near the user's vehicle as subject vehicles and a user's vehicle traveling path detecting section that is configured to detect the traveling path of the user's vehicle as a subject vehicle,
wherein said other vehicle traveling path detecting section comprises an other vehicle position detecting section that is configured to detect the positions of vehicles other than the user's vehicle near the user's vehicle relative to the user's vehicle; an other vehicle tracking section that is configured to track vehicles other than the user's vehicle near the user's vehicle based on the relative positions of the other vehicles detected by the other vehicle position detecting section; and an other vehicle traveling path detecting section that is configured to detect the traveling paths of vehicles other than the user's vehicle as subject vehicles based on a history of the relative positions of the other vehicles tracked by the other vehicle tracking section, and wherein, concerning a subject vehicle other than the user's vehicle, said certainty level calculating section is configured to calculate the certainty that the subject vehicle is traveling along a road such that said certainty of the subject vehicle is made larger as the frequency that the other vehicle tracking section succeeded in tracking the subject vehicle increases.

20. The on-vehicle road configuration identifying device according to claim 11, comprising:
position calculating means for calculating the position of a subject vehicle; and
intersection detecting means for detecting whether or not an intersection is present near a subject vehicle based on the position of the subject vehicle calculated by said position calculating means and map data,
wherein, in the case where said intersection detecting means detects that an intersection is present near a subject vehicle, said certainty level calculating section calculates the certainty that the subject vehicle is traveling along a road such that said certainty of the subject vehicle is made smaller than in other cases.

21. A road configuration identifying method for identifying the road configuration near a user's vehicle, said method comprising:
detecting the traveling path of at least one subject vehicle, where said at least one subject vehicle includes at least one vehicle near the user's vehicle;
calculating a certainty level for each subject vehicle that the subject vehicle is traveling along a road based on the state of the subject vehicle; and
predicting using a processor, as the road configuration near the user's vehicle, a road configuration associated with at least one of said subject vehicles having a calculated certainty level that is higher than a certainty level calculated for at least one other of said subject vehicles.

22. The on-vehicle road configuration identifying method according to claim 21,
wherein said at least one subject vehicle includes the user's vehicle in addition to the at least one vehicle near the user's vehicle.

23. The on-vehicle road configuration identifying method according to claim 21, comprising:
providing a warning of a potential collision between the user's vehicle and a vehicle near the user's vehicle, based on the predicted road configuration near the user's vehicle.

* * * * *